United States Patent
Ottney

(10) Patent No.: US 8,072,469 B2
(45) Date of Patent: Dec. 6, 2011

(54) FUSION NIGHT VISION SYSTEM WITH PARALLAX CORRECTION

(75) Inventor: Joseph C. Ottney, Londonderry, NH (US)

(73) Assignee: L-3 Communications Insight Technology Incorporated, Londonderry, NH (US)

( * ) Notice: Subject to any disclaimer, the term of this patent is extended or adjusted under 35 U.S.C. 154(b) by 893 days.

(21) Appl. No.: 12/053,690

(22) Filed: Mar. 24, 2008

(65) Prior Publication Data

US 2009/0058881 A1  Mar. 5, 2009

Related U.S. Application Data

(60) Provisional application No. 60/909,779, filed on Apr. 3, 2007.

(51) Int. Cl.
G09G 5/00 (2006.01)
G02B 27/14 (2006.01)

(52) U.S. Cl. ............................. 345/629; 345/8; 359/634
(58) Field of Classification Search .................. 345/629, 345/8; 382/254; 250/332, 330, 333; 359/634
See application file for complete search history.

(56) References Cited

U.S. PATENT DOCUMENTS

| | | | | |
|---|---|---|---|---|
| 7,307,793 B2 * | 12/2007 | Ottney et al. | ............... | 359/634 |
| 7,864,432 B2 * | 1/2011 | Ottney | ............... | 359/634 |
| 2004/0169663 A1 * | 9/2004 | Bernier | ............... | 345/629 |
| 2005/0035925 A1 * | 2/2005 | Ostromek et al. | ............... | 345/8 |
| 2008/0166061 A1 * | 7/2008 | Hohenberger et al. | ............... | 382/254 |
| 2009/0200468 A1 * | 8/2009 | Reed et al. | ............... | 250/332 |
| 2011/0089325 A1 * | 4/2011 | Ottney | ............... | 250/333 |

OTHER PUBLICATIONS

Anil K. Jain, Fundamentals of Digital Image Processing, BOOK, 14 pages, 1989 by Prentice-Hall, Inc., Englewood Cliffs, New Jersey.

* cited by examiner

*Primary Examiner* — Chante Harrison

(57) ABSTRACT

A fusion night vision system corrects for parallax error by comparing an image from a first sensor with an image from a second sensor.

33 Claims, 10 Drawing Sheets

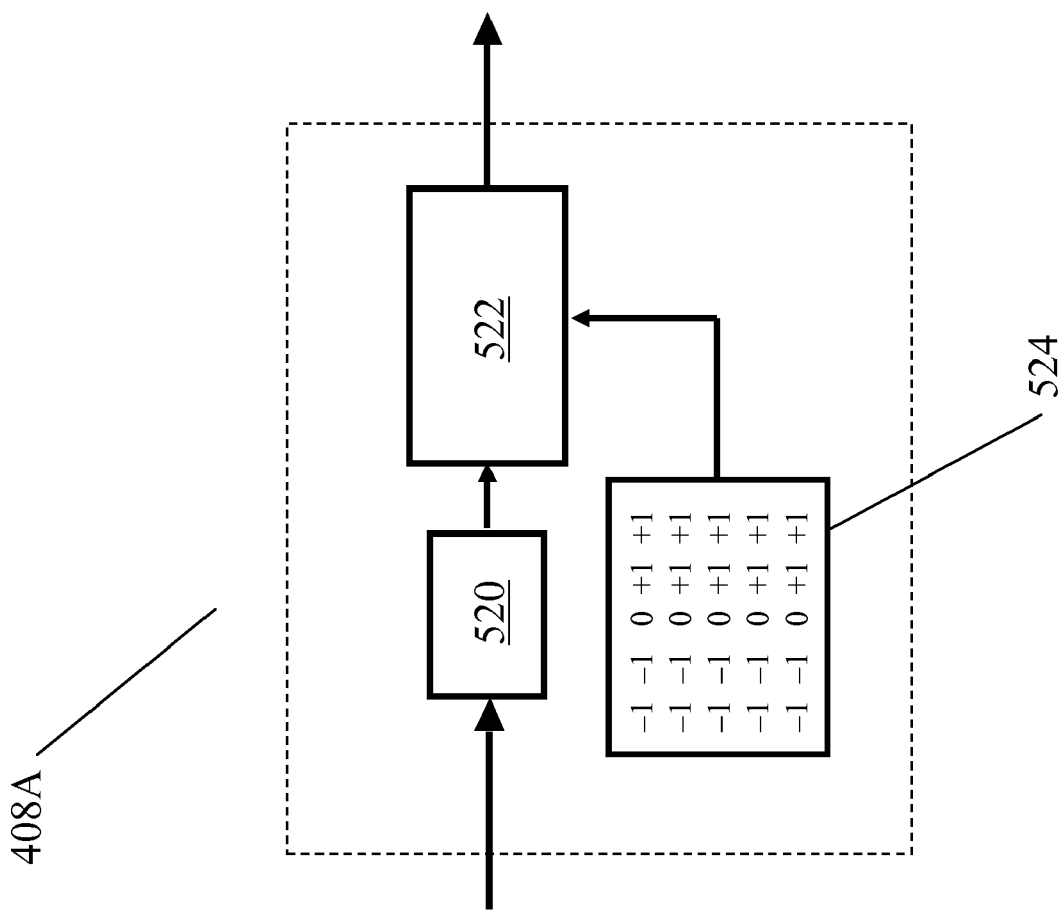

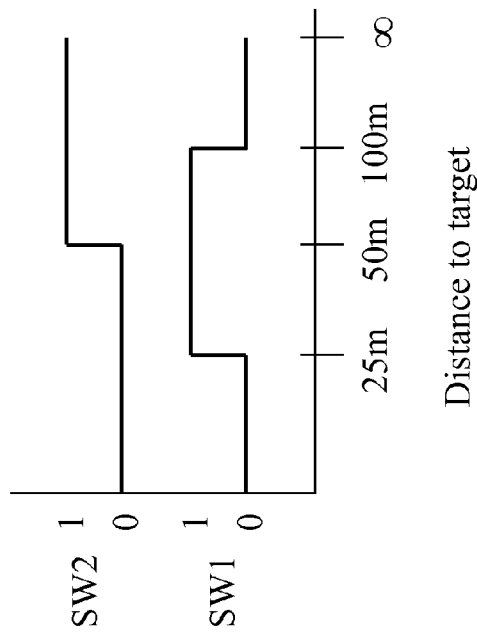
Figure 6B
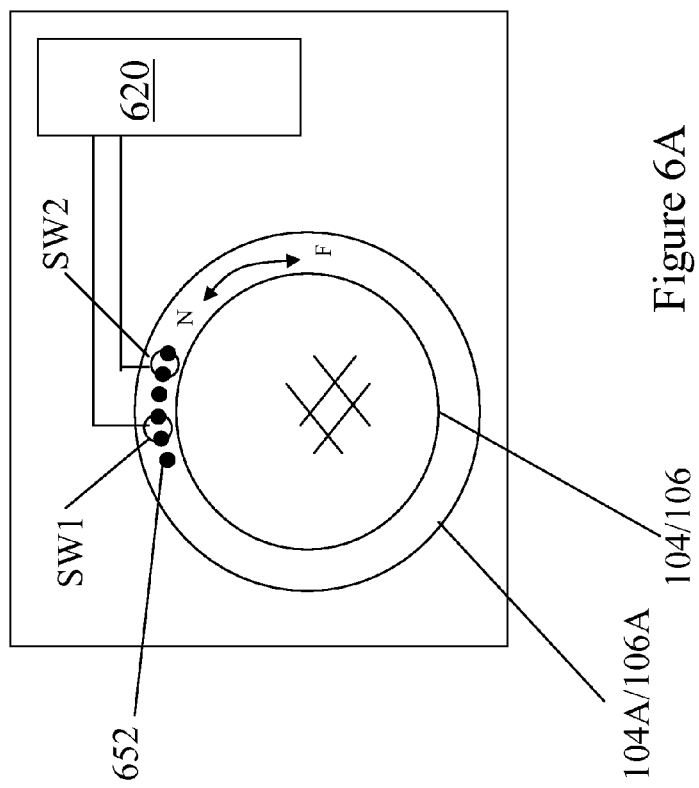
Figure 6A
| Distance to target | SW1 | SW2 | Image Shift |
|---|---|---|---|
| 0-25m | 0 | 0 | 10 pixels |
| 25-50m | 1 | 0 | 5 pixels |
| 50-100m | 1 | 1 | 3 pixels |
| 100- infinity | 0 | 1 | 1 pixel |
Figure 6C

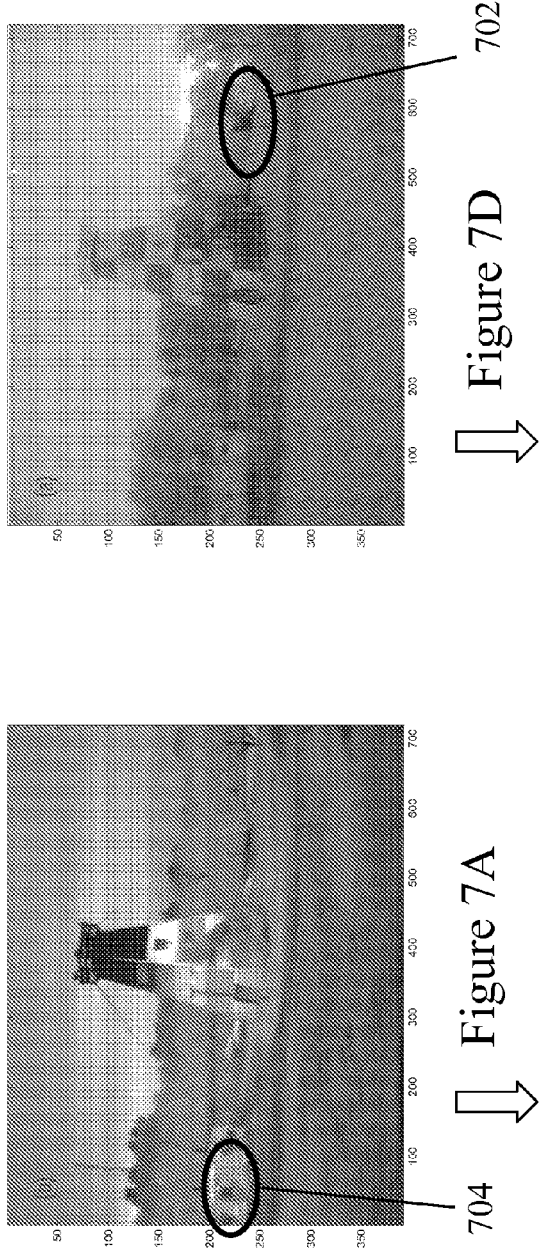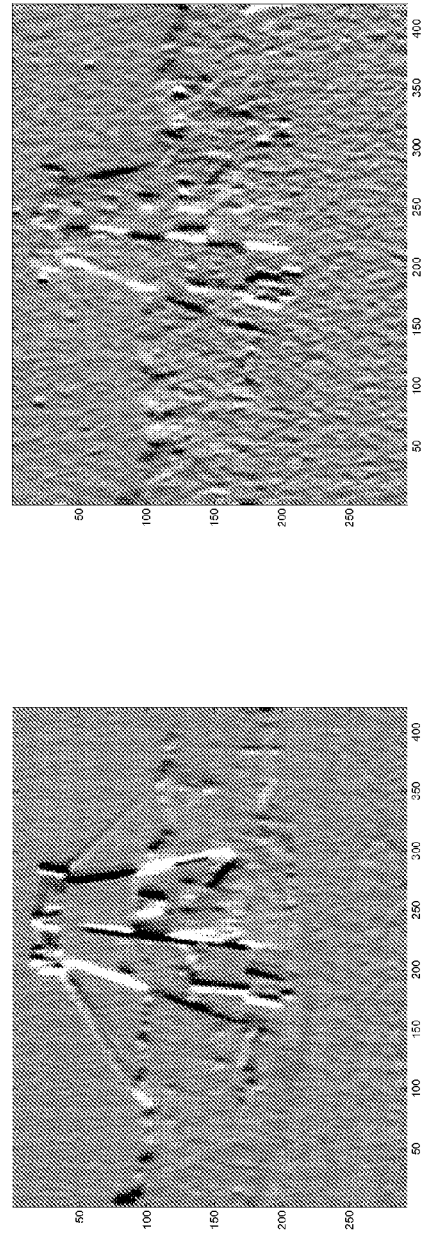
Figure 7D
Figure 7E
Figure 7A
Figure 7B

FUSION NIGHT VISION SYSTEM WITH PARALLAX CORRECTION

CROSS REFERENCE TO RELATED APPLICATIONS

The present application claims the benefit of U.S. provisional patent application Ser. No. 60/909,779, filed Apr. 3, 2007 the entire disclosure of which is incorporated herein by reference.

BACKGROUND OF THE INVENTION

Night vision systems include image intensification, thermal imaging, and fusion monoculars, binoculars, and goggles, whether hand-held, weapon mounted, or helmet mounted. Standard night vision systems are typically equipped with one or more image intensifier tubes to allow an operator to see visible wavelengths of radiation (approximately 400 nm to approximately 900 nm). They work by collecting the tiny amounts of light, including the lower portion of the infrared light spectrum, that are present but may be imperceptible to our eyes, and amplifying it to the point that an operator can easily observe the image through an eyepiece. These devices have been used by soldier and law enforcement personnel to see in low light conditions, for example at night or in caves and darkened buildings. A drawback to night vision goggles is that they cannot see through smoke and heavy sand storms and cannot see a person hidden under camouflage.

Infrared thermal imagers allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects like trees or buildings. Since the primary source of infrared radiation is heat or thermal radiation, any object that has a temperature radiates in the infrared. One advantage of infrared sensors is that they are less attenuated by smoke and dust and a drawback is that they typically do not have sufficient resolution and sensitivity to provide acceptable imagery of the scene.

Fusion systems have been developed that combine image intensification with infrared sensing. The image intensification information and the infrared information are fused together to provide a fused image that provides benefits over just image intensification or just infrared sensing.

BRIEF DESCRIPTION OF THE DRAWINGS

For a better understanding of the invention, together with other objects, features and advantages, reference should be made to the following detailed description which should be read in conjunction with the following figures wherein like numerals represent like parts:

FIG. 5 is a block diagram of a horizontal/vertical feature filter circuit consistent with an embodiment of the invention.

FIG. 6A is a schematic of a mechanical range finder consistent with an embodiment of the invention.

FIG. 6B is a switch state diagram for the range finder of FIG. 6A consistent with an embodiment of the invention.

FIG. 6C is a coarse parallax correction look-up table consistent with an embodiment of the invention.

FIG. 7A is an image of a scene from a first sensor of the fusion night vision system of FIG. 1.

FIG. 7B is the output of the image of FIG. 7A after passing though a horizontal/vertical feature filter circuit consistent with an embodiment of the invention.

FIG. 7D is an image of a scene from a second sensor of the fusion night vision system of FIG. 1.

FIG. 7E is the output of the image of FIG. 7D after passing though a horizontal/vertical feature filter circuit consistent with an embodiment of the invention.

DETAILED DESCRIPTION

Figure 1:
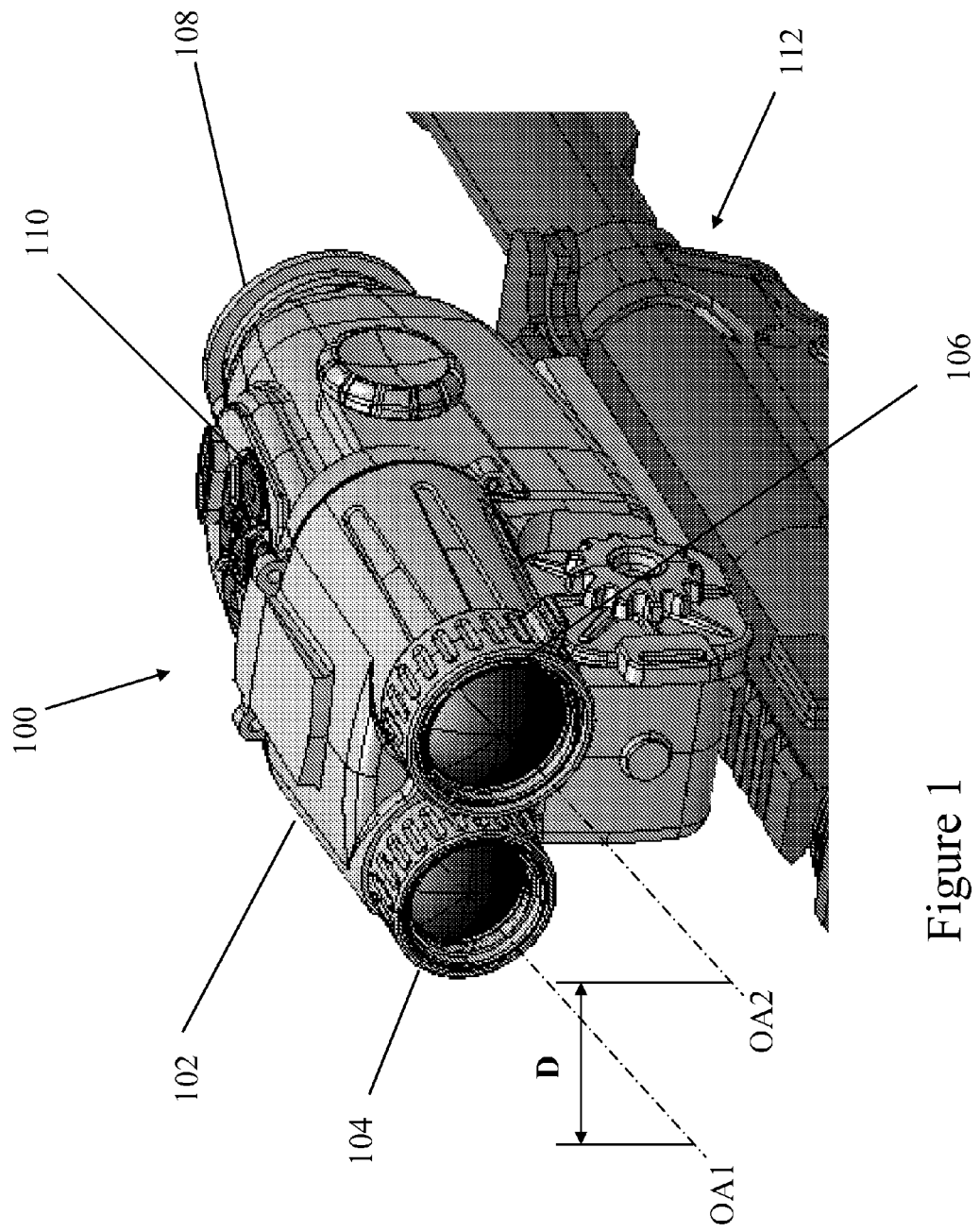
FIG. 1 is an isometric view of a fusion night vision system consistent with an embodiment of the invention.
Figure 2:
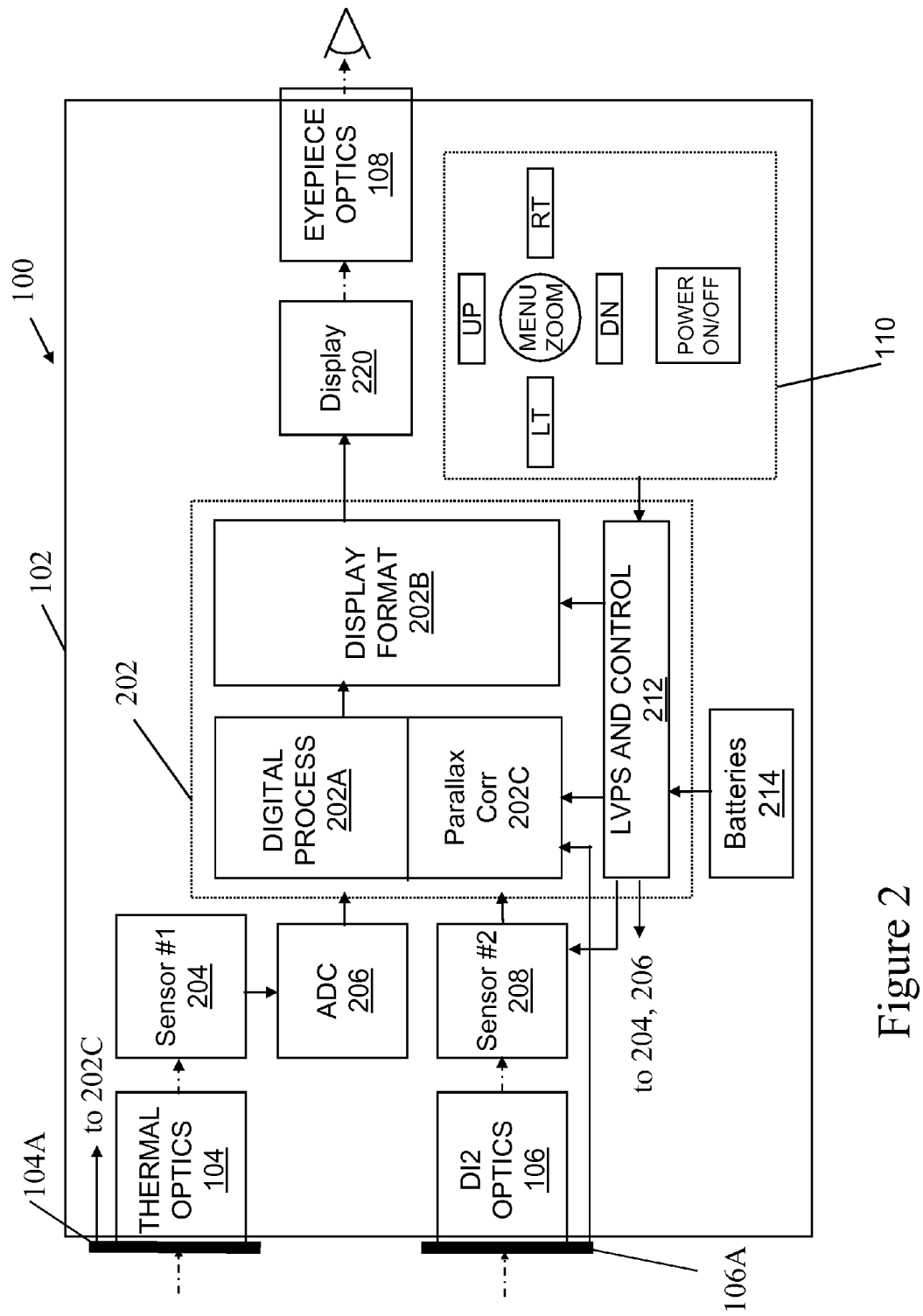
FIG. 2 is a block diagram of the fusion night vision system of FIG. 1.

FIG. 1 is an isometric view and FIG. 2 is a block diagram of a fusion night vision system 100 consistent with an embodiment of the invention. The night vision system electronics and optics may be housed in a housing 102 which may be mounted on a weapon 112 to aid in identifying a threat and aiming of the weapon. The night vision system 100 may have a first sensor 204 located behind first objective optics 104 and a second sensor 208 located behind second objective optics 106. The first sensor 204 may be configured to image scene information in a first range of wavelengths (7,000 nm-14,000 nm) and the second sensor 208 may be configured to image scene information from a second range of wavelengths (400 nm to 900 nm). The first sensor 204 may be an uncooled microbolometer focal plane array sensitive to long wave infrared radiation and the second sensor may be a digital image intensification (DI2) device such as the electron bombarded active pixel sensor (EBAPS) sensitive to shorter wavelength radiation. Each sensor 204, 208 may have a two-dimensional array of detector elements that is translated into electric impulses that are communicated to signal processing electronics 202. The signal processing electronics 202 may then translate the electric impulses into data for a display 220 for viewing through an eyepiece optics 108. Other sensor/detector technologies including cooled long wave or mid wave infrared focal plane array, digital image intensification tube, a charge-coupled device (CCD) or complementary metal oxide semiconductor (CMOS) imager, or short wave infrared InGaAs array may be used without departing from the invention.

The system may have one or more actuators 110 for controlling system operation. Although the objective optics are shown spaced in the horizontal direction, they may be spaced in the vertical direction or a combination of vertical and horizontal without departing from the invention. Although the fusion night vision device is shown as a monocular, it may be binocular or biocular without departing from the invention. Although the fusion night vision system is shown as being weapon mountable, it may be helmet mounted or handheld without departing from the invention.

The fusion night vision system 100 may have the optical axis OA1 of the first objective optics 104 physically offset a fixed distance "D" from the optical axis OA2 of the second objective optics 106. The optical axes of the first and second objective optics 104, 106 are typically factory aligned such that the image from the first sensor is fused and is aligned with the image from the second sensor for viewing by an operator as a unified image in the display 220 through the eyepiece 108 when the object/target being viewed is at a predetermined distance, typically aligned at infinity. At distances different from the predetermined distance, parallax can cause a misalignment of the two images as viewed in the eyepiece. The parallax problem may exist if the objective optics 104, 106 are offset in the horizontal as well as the vertical directions. The eyepiece 108 may have one or more ocular lenses for magnifying and/or focusing the fused image. The display 220 may be a miniature flat panel display, for example an organic light emitting diode (OLED) microdisplay or a liquid crystal display (LCD).

Figure 3:
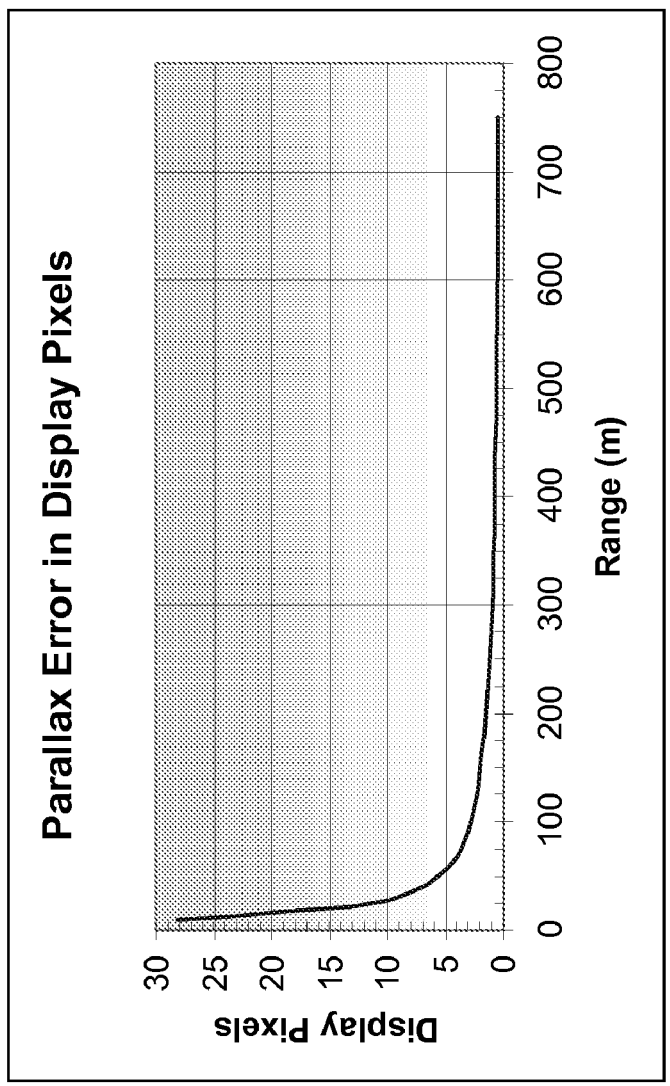
FIG. 3 is a plot of misregistration of pixels due to parallax as a function of distance to target for the fusion night vision system of FIG. 1.

FIG. 3 is a plot of misregistration of pixels due to parallax as a function of distance to target for the fusion night vision system 100. The plot shows that for the system 100 with the optical axes OA1, OA2 of objective optics 104, 106 spaced by 1.6", the image from the first sensor will be misregistered with the image from the second sensor in the display 220 by more than ten (10) pixels at a distance to target of less than 25 meters. The system 100 may reduce the misregistration using a coarse correction based on the position of one or both of the movable focus rings 104A, 106A and a fine correction based upon an autoalignment circuit. The system 100 may shift the position of the image from each sensor an equal and opposite number of pixels prior to fusion and display in order to maintain boresight of the system 100 to the weapon 112. Shifting one of the images one more, or one less, pixel than the other image prior to fusion and display may be done without departing from the invention. Alternatively, the system 100 may reduce misregistration using just the autoalignment circuit, i.e without the coarse correction.

Scene information from the first sensor 204 may enter an analog to digital conversion circuit 206 before entering signal processing electronics 202 and scene information from the second sensor 208 may enter the signal processing electronics 202 in digital form directly. Batteries 214 may provide power to a low voltage power supply and controller 212 which provides conditioned power distributed throughout the system. The signal processing electronics 202 may include a digital processing circuit 202A, a display formatter circuit 202B, and a parallax correction circuit 202C.

Figure 4:
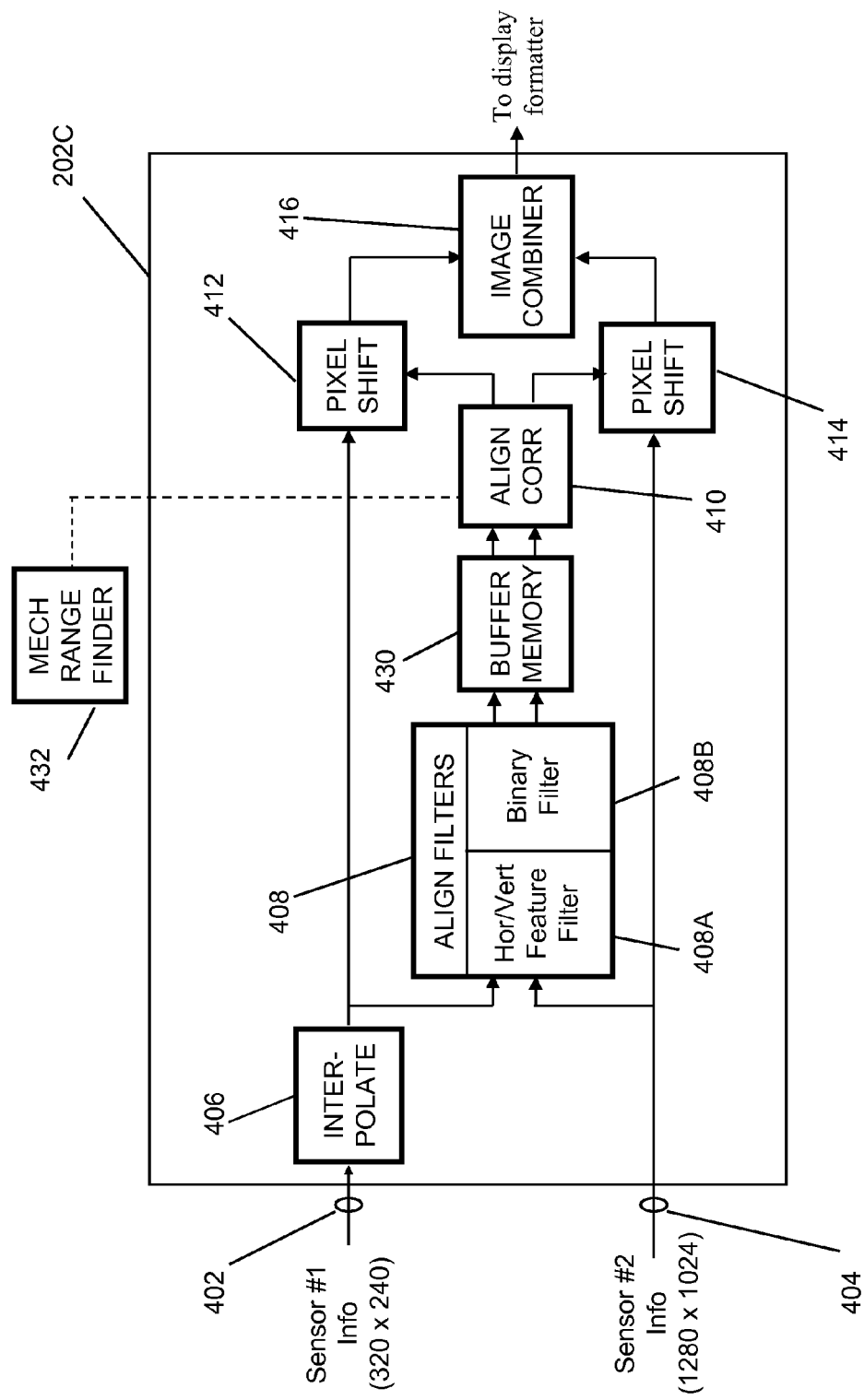
FIG. 4 is a block diagram of a parallax correction circuit consistent with an embodiment of the invention.

FIG. 4 is a block diagram of the parallax correction circuit 202C consistent with an embodiment of the invention. The parallax correction circuit 202C may be part of the digital processing circuit 202A. The first sensor 204 may be a microbolometer array with 320×240 pixels and generate an output 402 and the second sensor 208 may be an EBAPS device with 1280×1024 pixels and generate an output 404. An interpolation circuit 406 may scale/interpolate the output from the first sensor 204 so it is approximately the same size in number of pixels as the output from the second sensor 208. The output from the interpolation circuit 406 and the second sensor 208 may be directed to an alignment filter 408 and respective first and second pixel shift circuits 412, 414. The alignment filter 408 may first pass the scene information from the first sensor 204 and the second sensor 208 through a horizontal/vertical feature filter circuit 408A to define edges in the scene information and then through a second filter 408B that converts the output of the horizontal/vertical feature filter circuit 408A to a binary output. Edges may be defined as pixel intensity discontinuities or localized intensity gradients within an image. Edges may help characterize an object boundary and therefore may be useful for detection of objects in a scene. Known edge detection circuits are disclosed in Fundamentals of Digital Image Processing authored by Anil K. Jain and published by Prentice-Hall, Inc., and are incorporated herein by reference in their entirety. For each image originating from the first sensor 204 and the second sensor 208, the horizontal/vertical feature filter circuit 408A may produce an image of edges and the second filter 408B may convert the image into a binary map of edges with each pixel location assigned a value of one (1) or zero (0) based upon the edge intensity. Any pixel at the output of the horizontal/vertical feature filter circuit 408A with pixel value equal to or above a predetermined positive threshold (for example +16 with an 8-bit bipolar image) or equal to or below a predetermined negative threshold (for example −16 with an 8-bit bipolar image) may be assigned to a value of one (1) by the binary filter 408B. Any pixel at the output of the horizontal/vertical feature filter circuit 408A with pixel value between the predetermined positive and negative threshold may be assigned the value of zero (0) by the binary filter 408B. The binary edge map of 1's and 0's produced at the binary filter output for each image originating from the first sensor 204 and the second sensor 208 is temporarily stored within the buffer memory 430 accessible by the alignment correlation circuit 410.

The alignment correlation circuit 410 accesses the binary edge maps held within the buffer memory 430 and may use a coarse alignment estimate based on "rough" distance to target information to speed up processing. The "rough" distance to target information may be provided by a mechanical range finder 432 or other means including input by the user.

FIG. 5 is a block diagram of the horizontal/vertical feature filter circuit 408A consistent with the invention. The horizontal/vertical feature filter circuit 408A may include a multi-row, multi-column buffer 520 and a multi-row, multi-column convolver 522 and a multi-row, multi-column convolution kernel 524. Other values in the convolution kernel 524 may be used without departing from the invention. Although the convolver is shown as being 5×5, other sized convolver with extent smaller or larger may be used without departing from the invention, for example a 3×3, 7×7 or 9×9 convolver may be used. Although the convolution kernel 524 as shown is designed to locate vertical features within an image (as may be used for systems with horizontal placement of the objective optics 104, 106) it should be readily apparent that by transposing the kernel 90° the filter will perform equally well in locating horizontal image features (as may be used for systems with vertical placement of the objective optics 104, 106) without departing from the invention.

A mechanical range finder may require the operator to focus one of the focus rings 104A, 106A on a target and a linear or rotational position sensor could be used to determine the distance to target (see FIGS. 6A-6C and discussed in further detail below). Alternatively, a mechanical circuit may include a linear or rotary potentiometer mechanically coupled to one of the focus rings 104A, 106A. In an alternative embodiment, the system may accept inputs from a user regarding the distance to target. The input may be received through a near/far actuator or a menu selection. The system may be designed so the operator selects the far mode when the object being viewed is greater than 100 meters away and the operator selects the near mode when the object being viewed is less than 100 meters away. Distances other than 100 meters may be chosen without departing from the invention. The fusion night vision system may also incorporate multiple distance choices, for example close, less than 25 meters; mid range, 25-50 meters; long range, 50-100 meters; real long range, greater than 100 meters without departing from the invention.

The alignment correlation circuit 410 may receive the distance to target information from the mechanical range finder 432 to establish a coarse estimate of the amount of image shift required. Using the coarse estimate as an initial starting point the alignment correlation circuit 410 may then compare the binary maps held within buffer memory 430, corresponding to the location of object edges in the images produced by the first sensor 204 and the second sensor 208, to determine a fine alignment estimate. The alignment correlation circuit 410 may start the comparison of the binary edge maps shifted relative to each other based on the coarse estimate and then translate them left or right until a best match is found. A best match may be found when the number of matching pixels within the edge maps is highest, i.e. the peak of the correlation function, for the pixel shift attempted. For each increment in image shift, the alignment correlation circuit 410 may calculate the corresponding value of the correlation function by summing over all pixel locations the result of performing a pixel-by-pixel logical "and" operation between the two binary maps under evaluation with the net result being a count of all pixel locations for which a value of one (1) is present in both binary edge maps. Alternatively, the alignment correlation circuit 410 may use only a central portion of the binary maps without departing from the invention.

Figure 8:
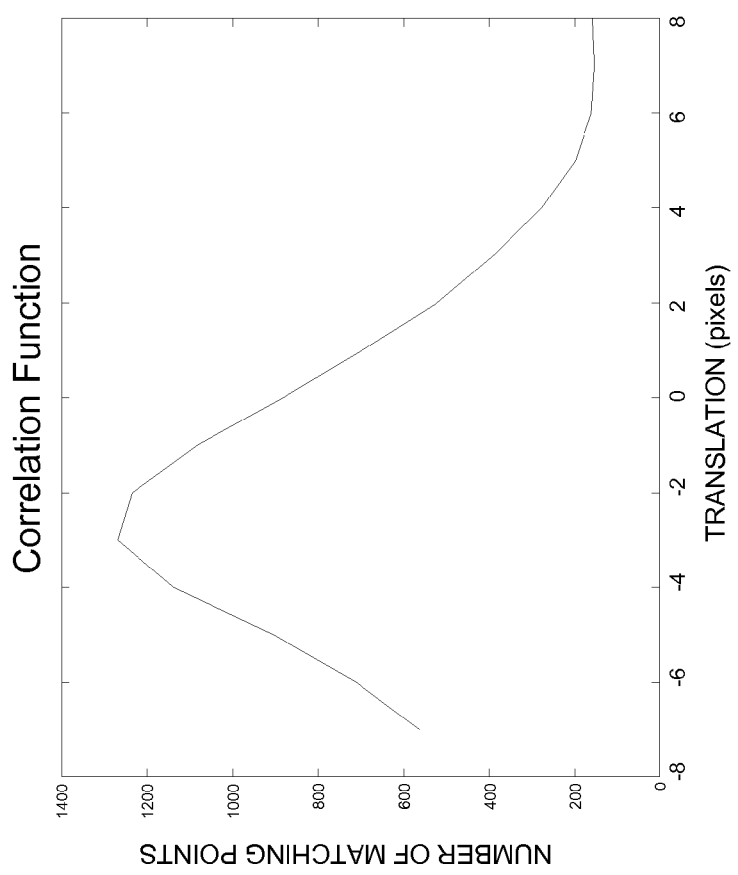
FIG. 8 is a plot of number of matching points versus translation useful in the parallax correction circuit of FIG. 4 consistent with an embodiment of the invention.

For the example shown in FIG. 8, the alignment correlation circuit has determined that the image from the first sensor should be shifted left (minus) three (3) pixels relative to the image from the second sensor as indicated by the peak in the correlation function as plotted. It should be readily apparent to those skilled in the art that a correlation circuit based upon a logical "nor" operation would produce equally valid results without departing from the invention if the use of 0's and 1's within the binary edge maps were interchanged.

The output of the alignment correlation circuit 410 may instruct the first pixel shift circuit 412 to shift the interpolated output from the first sensor 204 to the left one (1) pixel and the second pixel shift circuit 414 to shift the output from the second sensor 208 to the right two (2) pixels where the sum total shift in pixels is equal to the sum of the coarse and fine alignment estimates. The outputs of the pixel shift circuits 412, 414 may be inputted into an image combiner 416 to combine the two images into a single fused image outputted to the display formatter 202B. An image combiner 416 may be a circuit that adds or fuses, in analog or digital form, the image from the first sensor 204 with the image from the second sensor 208 or may employ a more complex circuit designed for image fusion such as the Acadia processor from Pyramid Vision.

FIG. 6A is a schematic of a mechanical range finder, FIG. 6B is a switch state diagram, and FIG. 6C is a look up table consistent with the invention. Sensors SW1, SW2, for example Hall effect switches, may be located in the housing 102 adjacent a rotatable or translatable focus ring 104A, 106A that surrounds the objective optics 104, 106. The user can rotate or translate the focus ring 104A, 106A clockwise or counter-clockwise from near N to far F to focus on a target. As the focus ring 104A, 106A is rotated, the state of the sensors SW1, SW2 may be read by a processor 620. The processor 620 may be part of the low voltage power supply and controller 212 or may be part of the signal processing electronics 202. A series of magnets 652 in close proximity, or a single arcuate magnet, may be coupled to the focus ring 104A, 106A in an arcuate path. The magnets 652 may be located in holes formed in the focus ring 104A, 106A. The location and spacing of the sensors relative to the magnets may depend on the angular rotation of the focus ring 104A, 106A from near N to far F. The location of the sensors SW1, SW2 and the magnet(s) 652 may also be swapped without departing from the invention.

FIG. 6C is a coarse parallax correction look-up table consistent with the invention. As the distance to target changes, the processor 620 may provide the corresponding estimate for coarse alignment in pixels of image shift to the alignment correlation circuit 410. For example, when a target is approximately 75 meters away, the range finder 432 may send a signal to the alignment correlation circuit 410 that the images need to be shifted by a nominal amount of five (5) pixels in total.

Figure 7F:
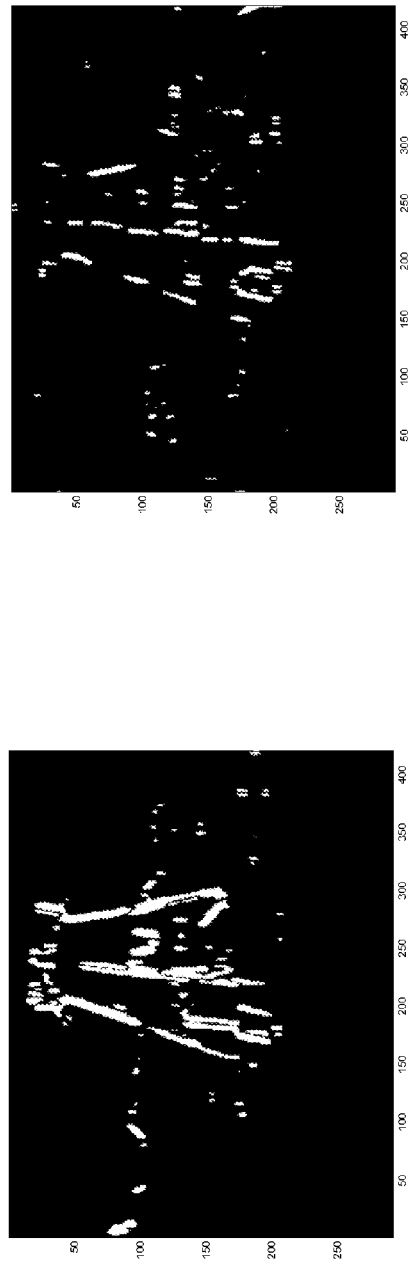
FIG. 7F is the output of the image of FIG. 7E after passing though a binary filter circuit consistent with an embodiment of the invention.
Figure 7G:
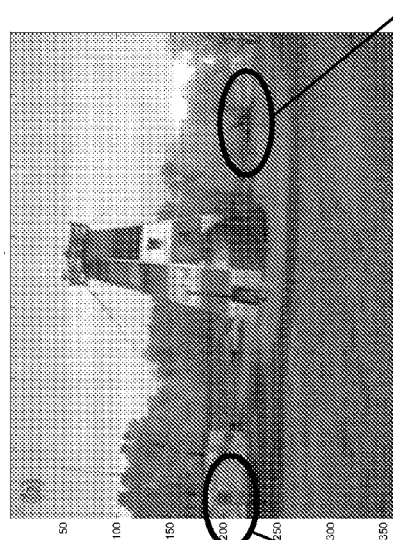
FIG. 7G is a fused image viewable through an eyepiece of the fusion night vision system of FIG. 1.
Figure 7C:
FIG. 7C is the output of the image of FIG. 7B after passing though a binary filter circuit consistent with an embodiment of the invention.

FIG. 7A is an image of a scene from the first sensor of the fusion night vision system 100; FIG. 7D is an image of the same scene from the second sensor of the fusion night vision system 100; and FIG. 7G is a fused/combined image viewable through the eyepiece 108 of the fusion night vision system 100. The fused image provides more scene information than either of the individual images. In FIG. 7D, an antenna 702 is viewable with the second sensor 208 but not with the first sensor 204 and in the FIG. 7A the doorway of the trailer is viewable with the first sensor 204 but not the second sensor 208. FIG. 7G shows the fused image in which the antenna 702 and the trailer doorway 704 are viewable. FIG. 7B shows the output of the horizontal/vertical feature filter circuit 408A and FIG. 7C shows the output of the binary filter 408B for the first sensor 204. FIG. 7E shows the output of the horizontal/vertical feature filter circuit 408A and FIG. 7F shows the output of the binary filter 408B for the second sensor 208.

Certain embodiments of the invention can be implemented in hardware, software, firmware, or a combination thereof. In one embodiment, the parallax correction circuit is implemented in software or firmware that is stored in a memory and that is executable by a suitable instruction execution system. If implemented in hardware, as in an alternative embodiment, the circuits can be implemented with any or a combination of the following technologies, which are well known in the art: a discrete logic circuit(s) having logic gates for implementing logic functions upon data signals, an application specific integrated circuit (ASIC) having appropriate combinational logic gates, a programmable logic device (PLD), a field programmable gate array (FPGA), etc.

Figure 9:
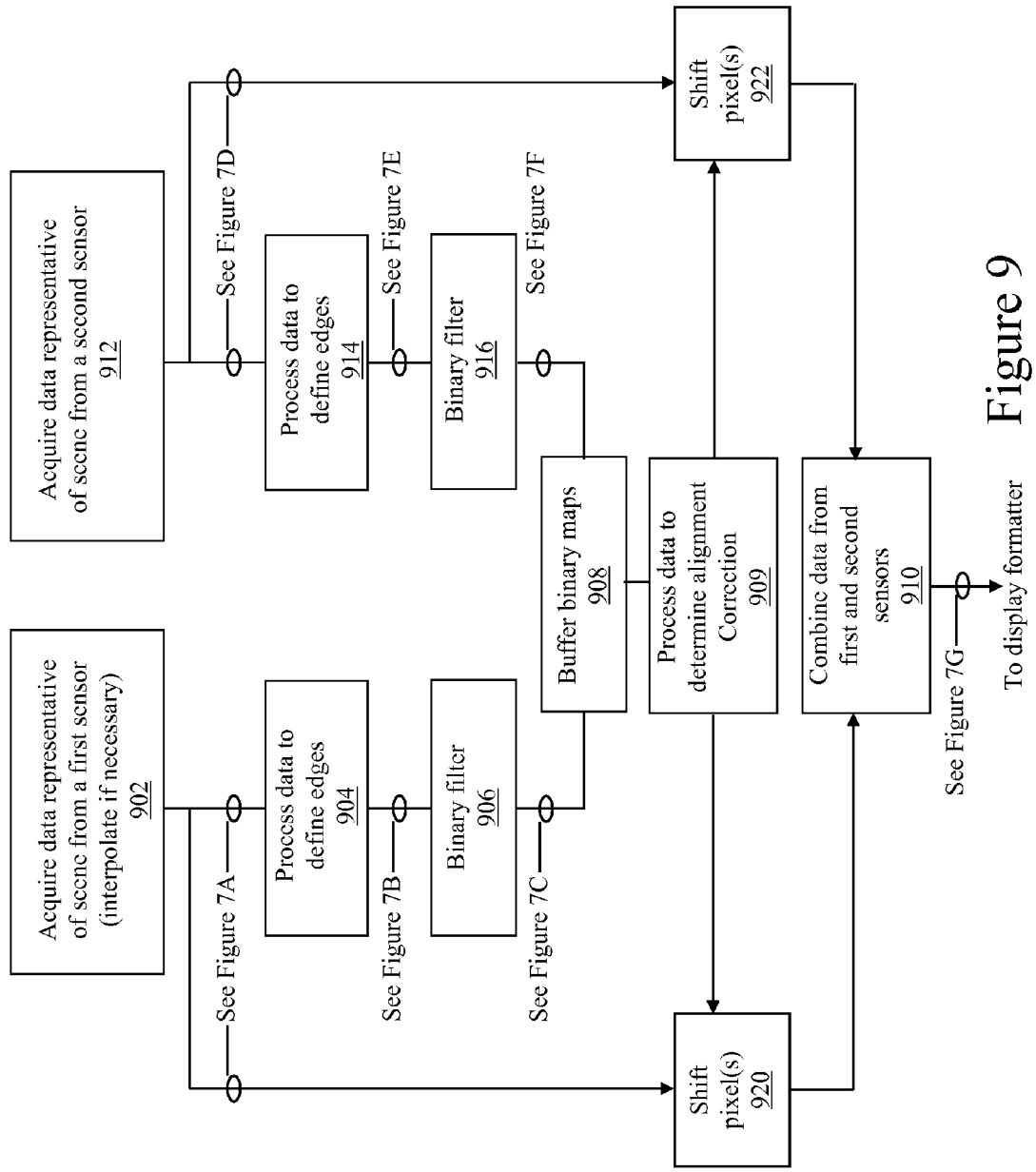
FIG. 9 is a fusion alignment flow chart consistent with an embodiment of the invention.

FIG. 9 is a fusion alignment flow chart consistent with an embodiment of the invention. The first sensor acquires data representative of a scene at block 902 and the second sensor acquires data representative of the same scene at block 912. The output of the first sensor is received by the first shift pixel circuit at block 920 and the horizontal/vertical feature filter circuit at block 904 and output of the second sensor is received by the second shift pixel circuit at block 922 and the horizontal/vertical feature filter circuit at block 914. The horizontal/vertical feature filter circuit filters the data from each sensor to define edges and then outputs the data from the first sensor to the binary filter at block 906 and the data from the second sensor to the binary filter at block 916. The binary filter converts each pixel to one of two unique values (e.g. 0 and 1). The outputs of the binary filter circuits (binary edge maps) are then inputted to the buffer memory at block 908. The alignment correlation circuit at block 909 may then start the comparison by translating the binary edge maps temporarily stored within the buffer memory and corresponding to images from the first and the second sensors left and right about the coarse align position until a best match is found. The alignment correlation circuit then instructs the pixel shift circuits how many pixels to move the image and in which direction at block 920, 922. After the first and second images are shifted (if necessary), the images are combined in a combiner at block 910 and outputted to the display formatter.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A fusion night vision system, comprising:
   a housing;
   a first sensor for acquiring scene information representative of a scene in a first range of wavelengths;
   a second sensor for acquiring scene information representative of the scene in a second range of wavelengths;
   a feature filter circuit configured to receive data from the first and second sensors;
   a binary filter circuit configured to receive the outputs of the feature filter circuit;
   a memory buffer to temporarily store the binary filter circuit outputs; and
   an alignment correlation circuit configured to determine how much to shift an image based on the outputs of the binary filter as stored within the memory buffer; and
   a first pixel shift circuit configured to receive the scene information from the first sensor and shift the scene information based on information received from the alignment correlation circuit.

2. The fusion night vision system of claim 1, wherein the first range of wavelengths is approximately 7,000 nm to approximately 14,000 nm and the second range of wavelengths is approximately 400 nm to 900 nm.

3. The fusion night vision system of claim 1, further comprising a display for projecting a combined image from the first sensor and the second sensor.

4. The fusion night vision system of claim 3, wherein the display has a plurality of individual pixels arranged in rows and columns.

5. The fusion night vision system of claim 3, wherein the alignment correlation circuit receives distance to target information from a position of a rotatable focus ring.

6. The fusion night vision system of claim 1, wherein the first sensor is an uncooled microbolometer focal plane array and the second sensor is an electron bombarded active pixel sensor.

7. The fusion night vision system of claim 1, further comprising an image combiner coupled to the first pixel shift circuit for combining the scene information from the first sensor with scene information from the second sensor.

8. The fusion night vision system of claim 1, further comprising a second pixel shift circuit configured to receive the scene information from the second sensor and shift the scene information based on information received from the alignment correlation circuit.

9. The fusion night vision system of claim 8, wherein the first and second pixel shift circuits are coupled to an image combiner.

10. The fusion night vision system of claim 9, wherein the image combiner is a selected one of a digital fusion circuit and an analog fusion circuit.

11. The fusion night vision system of claim 1, wherein the feature filter circuit comprises a multi-row, multi-column buffer and a multi-row, multi-column convolution kernel.

12. A method of displaying information in a fusion night vision system, comprising the steps of:
    acquiring scene information from a first sensor configured to process information in a first range of wavelengths;
    acquiring scene information from a second sensor configured to process information in a second range of wavelengths;
    filtering the first acquired scene information to determine horizontal or vertical features;
    filtering the second acquired scene information to determine horizontal or vertical features;
    converting the filtered first acquired scene information to a first binary output;
    converting the filtered second acquired scene information to a second binary output; and
    temporarily storing the first and second binary outputs in a memory buffer; and
    comparing the first binary output to the second binary output at multiple translational displacements to determine a best match.

13. The method of claim 12, further comprising the step of shifting an image of the scene from the first sensor relative to an image of the scene from the second sensor based on the best match.

14. The method of claim 13, wherein the amount of shifting is initially based on information received from a rangefinder.

15. The method of claim 14, wherein the amount of shifting is initially based on information received from a rotational position of a focus ring.

16. The method of claim 12, further comprising the step of combining an image of the scene from the first sensor with an image of the scene from the second sensor in a combiner.

17. The method of claim 16, further comprising the step of displaying the combined image in a display aligned with an eyepiece for viewing by an operator.

18. A fusion night vision system, comprising:
    a housing;
    an eyepiece;
    an image combiner;
    a first sensor at least partially disposed within the housing for processing information in a first range of wavelengths;
    a second sensor at least partially disposed within the housing for processing information in a second range of wavelengths;
    a display aligned with the eyepiece; and
    signal processing electronics coupled to the first sensor, the second sensor, and the display, the signal processing electronics generating a first image based on scene information from the first sensor and a second image based on scene information from the second sensor, the signal processing electronics further comparing information from the first image with information from the second image to determine how many pixels the first and the second image should be shifted in the display.

19. The fusion night vision system of claim 18, wherein the first range of wavelengths is approximately 7,000 nm to approximately 14,000 nm and the second range of wavelengths is approximately 400 nm to 900 nm.

20. The fusion night vision system of claim 19, wherein the signal processing electronics further comprises a first and a second pixel shift circuit configured to receive the first and the second images and shift information from an alignment correlation circuit.

21. The fusion night vision system of claim 20, wherein the first and second pixel shift circuits are coupled to an image combiner.

22. The fusion night vision system of claim 21, wherein the image combiner is a selected one of a digital fusion circuit and an analog fusion circuit.

23. The fusion night vision system of claim 18, wherein the display has a plurality of individual pixels arranged in rows and columns.

24. The fusion night vision system of claim 18, wherein the signal processing electronics receives distance to target information from a position of a rotatable focus ring.

25. The fusion night vision system of claim 18, wherein the first sensor is an uncooled microbolometer focal plane array and the second sensor is an electron bombarded active pixel sensor.

26. The fusion night vision system of claim 18, further comprising an image combiner for combining the scene information from the first sensor with scene information from the second sensor for display in the display.

27. A fusion night vision system, comprising:
a housing;
an eyepiece;
a first sensor for processing information in a first range of wavelengths, the first sensor at least partially disposed within the housing and having a first optical axis;
a second sensor for processing information in a second range of wavelengths, the second sensor at least partially disposed within the housing and having a second optical axis, the first optical axis being spaced from the second optical axis;
a display aligned with the eyepiece, the display having a plurality of individual pixels arranged in rows and columns; and
an alignment correlation circuit configured to determine how many pixels to shift a first image from the first sensor in the display by comparing filtered data from the first sensor with filtered data from the second sensor.

28. The fusion night vision system of claim 27, wherein information from a selected one of the first and the second sensors is shifted on the display so as to align the information from the first sensor with information from the second sensor when viewed through the eyepiece.

29. The fusion night vision system of claim 27, wherein the first range of wavelengths is approximately 7,000 nm to approximately 14,000 nm and the second range of wavelengths is approximately 400 nm to 900 nm.

30. The fusion night vision system of claim 27, wherein the first sensor is an uncooled microbolometer focal plane array and the second sensor is an electron bombarded active pixel sensor.

31. The fusion night vision system of claim 27, further comprising a focus ring aligned with and rotatable about the first optical axis for determining a distance to target.

32. The fusion night vision system of claim 27, wherein movement of the focus ring communicates a signal to the alignment correlation circuit indicative of the distance to target.

33. The fusion night vision system of claim 27, wherein the alignment correlation circuit is configured to receive rough distance to target information from a range finder.

* * * * *